May 10, 1938.   H. GIDDINGS   2,117,000
CAR VENTILATOR
Filed Dec. 21, 1936

INVENTOR.
Horace Giddings
BY  Booth & Booth
ATTORNEYS.

Patented May 10, 1938

2,117,000

UNITED STATES PATENT OFFICE 2,117,000

CAR VENTILATOR

Horace Giddings, San Francisco, Calif.

Application December 21, 1936, Serial No. 116,858

7 Claims. (Cl. 98—13)

The present invention relates to ventilators adapted for installation in the roofs of enclosed vehicles, especially freight cars and refrigerator cars.

The objects of the invention are to provide a ventilator which can be closed tightly to prevent loss of heat from the interior of the car; which can be opened to varying degrees to permit the entrance of more or less outside air under the influence of the wind created by the car's movement; which can be folded back upon the car roof when wide open to prevent increasing the total effective height of the car; and which will permit ventilation, and at the same time prevent rain water from entering the cargo space of the car, and prevent pilfering of the cargo therefrom. Other objects and advantages of the invention will become apparent from the following description which should be read with the understanding that the form, construction and arrangement of the several parts may be varied, within the scope of the appended claims, without departing from the spirit of the invention.

Reference will be made to the accompanying drawing, in which

Figure 2:
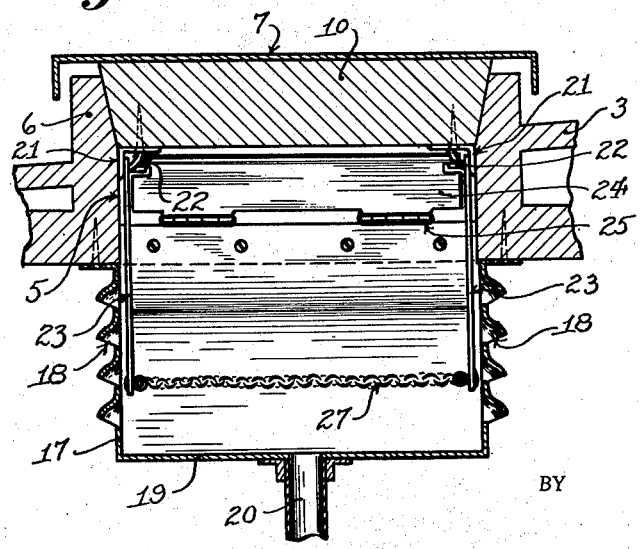
Fig. 2 is a transverse section taken from the right, as viewed in Fig. 1 and showing the ventilator closed.

In the drawing, the reference numeral 3 designates the roof of a car and 4 is one end wall thereof. A hatch 5 is formed in the roof and is surrounded by the usual raised combing 6. A metal plate 7 is hinged at 8 to a bracket 9 secured to one side of the combing 6. A plug 10 of insulating material is secured to the underside of the plate or cover 7, and when the latter is closed, as shown in Fig. 2, said plug 10 fits tightly within the hatch 5 and effectively seals the opening against loss of heat from the interior of the car.

A yoke or loop 11 extends from the free edge of the cover 7 and slides freely over a lever 12, the latter being hinged to the roof of the car at 13, and provided with a plurality of spaced holes 14 which register with corresponding slots 15 in the sides of the loop 11. A hook 16 is adapted to engage the slots 15 and any one of the holes 14 to hold the cover 7 in various open positions. When the cover is closed, the lever 12 lies down closely thereover, as shown in dotted lines in Fig. 1.

A metal box or housing 17 is secured inside the car under the hatch 5, and is provided with suitable louvres 18 in its sides to permit air to pass into the interior of the car. The bottom 19 of the housing slopes downwardly toward the end wall 4 and is provided with a drain pipe 20 to carry off any rain water which may enter through the hatch. Water is thus prevented from reaching the cargo space of the car, while air is freely admitted thereto through the louvres 18.

Figure 1:
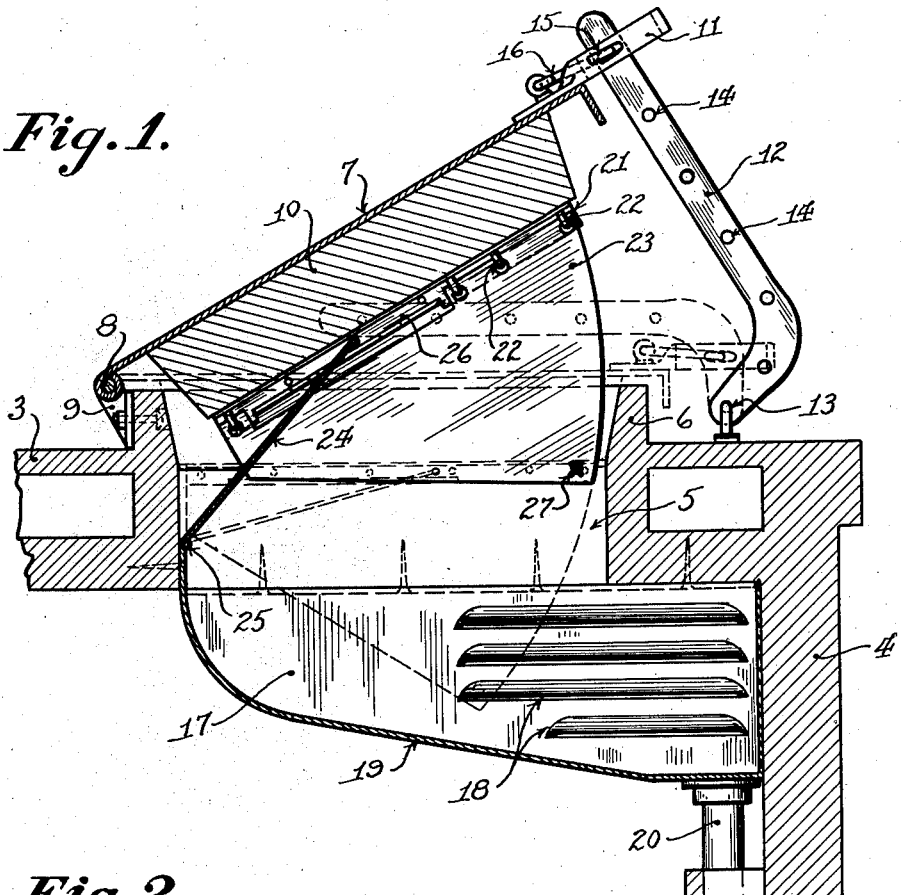
Fig. 1 is a longitudinal section of the ventilator as installed in the roof of an insulated car.

Angle irons 21 are secured to the bottom of the plug 10 along its side edges and are provided with spaced loops 22 which serve as hinge supports for side wings or deflectors 23 provided along their upper edges with holes through which said loops 22 are passed. The wings 23, which are approximately triangular in shape, hang vertically at the sides of the hatch 5 when the cover is in ventilating open position, as shown in Fig. 1, and shut out cross currents of air which would interfere with the main air current entering the ventilator. A transverse deflecting plate 24, positioned between the wings 23, is hinged to the upper rear edge of the housing 17, as shown at 25, and is provided at its upper edge with lugs adapted to slide in channels 26 formed in the angle irons 21. The plate 24 assists in deflecting the air into the housing 17, and prevents loss of air through the space between the rear edge of the plug 10 and the combing 6.

When it is desired to open the ventilator wide, and to eliminate its wind catching features, the cover 7 is swung back to lie flat on the roof 3 of the car. In this position, which is not shown in the drawing, the wings 23 fold down flat upon the plug 10, as will be readily understood from their shape and hinge mountings. A chain 27 extends across between the lower portions of said wings and causes them automatically to fold down when the cover 7 is thrown back flat upon the roof, the weight of said chain pulling said wings inwardly. The lugs of the transverse deflector 24 slide out from the open rear ends of the channels 26 when the cover is thrown back, allowing said deflector to drop down and rest within the rear portion of the housing 17.

It will be seen from the foregoing description that my device provides an adjustable ventilator adapted to catch the wind caused by the motion of the car and to conduct the air impelled by such wind into the interior of the car. At the same time, the housing 17 prevents rain from reaching the cargo space in the car, and prevents pilfering of the cargo through the hatch when the ventilator is open. It will also be observed that when the cover is thrown back flat upon the car roof, the various wind deflectors, both the wings 23 and the transverse plate 24, fold downwardly to retracted positions in which they are protected from damage and do not increase the total height of the car. Obviously, the cover 7 can be hinged to open either toward the end of the car or toward its center, the wind catching effect being the same in either case.

I claim:

1. In a vehicle having a roof provided with a hatch, a cover therefor, means for supporting said cover in inclined open position to direct air into said hatch, spaced wings extending from said cover downwardly into said hatch, hinges connecting said wings with said cover, and an articulated connecting member extending between said wings, said connecting member and said hinges causing said wings automatically to fold down flat upon said cover when the latter is inverted.

2. In a vehicle having a roof provided with a hatch, a hinged cover therefor, means for supporting said cover in inclined open position to direct air into said hatch, a deflector plate extending across the hinge of said cover within said hatch, a hinge connecting the lower edge of said plate with one side of said hatch, and a sliding connection between the upper edge of said plate and said cover.

3. In a vehicle having a roof provided with a hatch, a cover therefor, means for supporting said cover in inclined open position to direct air into said hatch, spaced wings extending downwardly from the sides of said cover into said hatch, and a transverse plate between said wings, the lower edge of said plate being hinged to the inside of said hatch and its upper edge being slidably connected with said cover, said wings and said plate assisting said cover to direct air into said hatch.

4. In a vehicle having a roof provided with a hatch, a cover therefor, means for supporting said cover in an inclined open position to direct air into said hatch, a housing positioned within the vehicle, said housing forming a catch basin for rain water entering through said hatch and being provided with openings to permit air to enter the vehicle, spaced wings extending downwardly from said cover, said wings being received within said housing when the cover is closed and forming side shields for the space between said cover and said hatch when said cover is in inclined open position, and a movably mounted deflector plate between said wings having its opposite edges positioned closely adjacent the under side of said cover and one side of said housing respectively.

5. In a vehicle having a roof provided with a hatch, a hinged cover therefor, means for supporting said cover in inclined open position to direct air into said hatch, and a deflector plate movably connected with said cover and one side of said hatch, said plate extending across said hinge and assisting said cover to deflect air downwardly into said hatch.

6. In a vehicle having a roof provided with a hatch, a hinged cover therefor, means for supporting said cover in inclined open position to direct air into said hatch, a housing forming a catch basin for rain water entering through said hatch, said housing having a water drain leading from its bottom and air openings in its walls, a pair of spaced wings hinged to said cover and extending downwardly into said housing, and an articulated connecting member extending between said wings, said connecting member causing said wings to fold down flat upon said cover when the latter is inverted.

7. In a vehicle having a roof provided with a hatch, a hinged cover therefor, means for supporting said cover in inclined open position to direct air into said hatch, a pair of spaced wings hinged to said cover and extending downwardly into said hatch, a movably mounted deflector plate extending across the hinge of said cover and lying between said wings when the cover is in inclined position, said plate moving out from between said wings when the cover is inverted upon the roof of the vehicle, and means connected with said wings for causing them to fold down flat upon said cover when the latter is inverted.

HORACE GIDDINGS.